United States Patent [19]

Firth

[11] 3,996,619
[45] Dec. 7, 1976

[54] TAPE EDGE GUIDE FOR A FULLY ROTATABLE DRUM

[75] Inventor: Ronald R. Firth, Fairport, N.Y.

[73] Assignee: Eastman Kodak Company, Rochester, N.Y.

[22] Filed: Aug. 14, 1975

[21] Appl. No.: 604,697

[52] U.S. Cl. .............................. 360/130; 226/196; 226/199

[51] Int. Cl.² ................. G11B 15/60; B65M 23/04; B65H 23/32

[58] Field of Search ............ 360/130, 84; 226/196, 226/199

[56] References Cited

FOREIGN PATENTS OR APPLICATIONS 2,025-66   2/1966   Japan ................................ 360/130

Primary Examiner—Robert S. Tupper
Attorney, Agent, or Firm—R. F. Cody

[57] ABSTRACT

In a video recorder having a fully rotatable drum over which a recording tape is advanced, lateral tape wander is controlled by the use of apparatus which provides edge guidance for the advancing tape while the tape is still on the rotating drum surface. The invention proposes the use of a rotatable drum having a groove which extends circumferentially around the outer drum surface. An edge guide member extends into the groove, providing tape edge guidance while permitting the drum to rotate freely.

11 Claims, 6 Drawing Figures

1.6 OUNCE WEIGHT

TENSION MEASURING DEVICE

TAPE EDGE GUIDE FOR A FULLY ROTATABLE DRUM

BACKGROUND OF THE INVENTION

1. Field of the Invention

The invention relates to a recording drum for use in a video recorder, and in particular provides apparatus for controlling lateral tape wander on the surface of a drum of the fully rotatable type.

2. Description Relative to the Prior Art

In a drum-type video recorder, a drum is provided around which a magnetic recording tape is helically wrapped. At least one magnetic transducer head cooperates with the drum, the head tip extending slightly from the drum surface. During operation, the transducer head is rotated concentrically with respect to the cylindrical surface of the drum at a high speed so as to bring the head repeatedly into contact with the tape, the tape being advanced over the drum, commonly at a rate of 1.5 to 7.5 inches per second. The result is that a signal is recorded in a series of slanted lines, or tracks, on the tape and the high head-to-tape speed enables signals of relatively high frequency content to be recorded.

For a drum-type video recorder commercially available today, the drum construction is generally one of two types — the stationary drum or the split drum. The stationary drum comprises a cylindrical surface which does not rotate; the magnetic recording tape is advanced over the stationary drum surface.

The split drum is more complex: In one of its forms, the split drum comprises an upper rotatable section and a lower stationary section, which together sandwich a high-speed rotary disc carrying the magnetic transducer head. When the recording tape is wrapped around the drum, approximately one-half of the tape area is supported by the rotatable section and one-half is supported by the stationary section. As the tape is advanced, frictional forces between the tape and the stationary section act to oppose the tape motion, thus creating a tension differential between tape on the supply side and the take-up side. In order to eliminate this tape tension differential, the upper drum section is rotated in the direction of the tape travel, and at a speed greater than the tape speed. Thus, frictional forces between the tape and the upper rotating section tend to assist the tape motion. By properly contouring the surfaces of the rotating and stationary sections to match friction coefficients, the opposing and assisting forces can be made to cancel each other, resulting in zero tape tension differential.

Both the split drum and the stationary drum produce considerable amounts of tape-to-drum friction. Although the split drum uses counterbalancing frictional forces to eliminate tape tension differential, it would be preferable to eliminate the tension differential by eliminating friction altogether. A third type of drum known, but not in popular use, comprises a one-piece fully rotatable drum; and substantially achieves this goal. As tape advances over the drum surface, the entire drum rotates, thereby forming an air layer between the tape and drum surface. The air layer acts as an efficient air bearing, resulting in small amounts of "drag" and almost no tape tension differential. In addition, the one-piece drum is frequently less costly to manufacture than the split drum, since the split drum requires the machining of two cylindrical surfaces instead of the single cylindrical surface required by the one-piece drum.

Despite inherent advantages, certain problems have inhibited the popular use of the one-piece fully rotatable drum. During operation, as noted above, substantially reduced amounts of "drag" are obtained by the formation of an air layer between the tape and the drum surface; and it is this air layer which offers little resistance to lateral tape motions, as well. Thus, slight perturbations, such as those caused by edge irregularities on the tape or by mechanical vibration, can cause the tape to "roam" laterally over the drum surface.

Even in small amounts, tape wander cannot be ignored. For example, during playback of "roaming" tape through a television receiver, visual effects will depend upon the severity of the wander. Effects range from the appearance of "snow" in the picture, caused by a decrease in the signal-to-noise ratio when wander is slight, to a complete loss of picture as wander becomes severe. A video recorder can be designed to tolerate low levels of wander by improving its signal-to-noise ratio, but this approach may price the recorder out of the market.

The problem of tape wander on a fully rotatable drum is caused by a lack of edge guidance. On a six-inch diameter drum, a 360° wrap produces over 18 inches of freely floating recording tape wrapped around the drum. And on a drum of this type, the tape cannot readily be provided with an edge guide since the entire drum rotates. This problem of edge guidance is not encountered in stationary drums or split drums. U.S. Pat. Nos. 3,354,269 and 3,661,311 disclose edge guides for use with stationary drums wherein an edge guide member is fastened to the outer surface of the stationary drum. Split drums generally have an edge guide channel machined into the lower non-rotating section, as disclosed in U.S. Pat. No. 3,840,895.

Although for two different types of drum construction, the above-mentioned edge guides all rely, for their successful operation, upon the presence of a non-rotating section of the drum upon which to fasten or machine an edge guide. None of these edge guides, or variations thereof, can even be used with a fully rotatable drum because the entire drum rotates during operation.

Although attempts have been made to reduce tape wander on a fully rotatable drum, a fully satisfactory solution has been elusive. For example, while it is true that increasing tape tension decreases tape wander, such a technique is not without problems, viz., increased tape tension produces increased levels of tape-to-drum friction, thereby resulting in an unwanted tape tension differential; and increased tape tension results in decreased head life.

Another method of reducing tape wander on a fully rotatable drum is proposed in U.S. Pat. No. 3,510,604 which discloses a rotatable drum consisting of a cylindrical section and a frusto-conical section which during operation produces a more even air layer between the tape and the drum surface. While a more even air layer may reduce wander caused by a non-uniform air layer, it does not inhibit wander produced by other sources (mechanical vibration, tape edge irregularities, etc). In addition, a frusto-conical surface presumably is not the easiest surface to machine.

SUMMARY OF THE INVENTION

Rather than increase the tape tension which would result in unwanted tape tension differential and decreased head life, and rather than adopt a frusto-conical drum construction which does not provide protection from tape wander due to vibrations, tape edge irregularities, etc, the present invention provides an edge guidance apparatus so designed as to control tape wander and yet not thwart the advantages inherent in a fully rotatable drum.

In order to provide edge guidance for a tape wrapped around a rotatable drum, while still permitting the drum to rotate freely, the invention proposes the use of a rotatable drum having a groove extending circumferentially around its outer surface. An edge guide member protrudes, i.e., extends, into the groove, thereby restraining lateral tape motion while permitting unhampered drum rotation. In a presently preferred form, the invention enables critical positioning and orienting of the edge guide member by providing means for adjusting the position of the edge guide member in a direction parallel to the groove, and means for adjusting the angular orientation of the guide member within the groove.

BRIEF DESCRIPTION OF THE DRAWINGS

In the detailed description of the preferred embodiments of the invention presented below, reference is made to the accompanying drawings, in which.

BRIEF DESCRIPTION OF THE PREFERRED EMBODIMENTS

During the operation of a video tape recorder employing a fully rotatable drum, a recording tape moving over the rotating drum often suffers a perturbation which causes the tape to deviate or "wander" from the intended path. The ensuing result is that a transducer head rotating with the drum records information on the tape at an improper tracking angle. During playback, the record track angle on the tape and the scan angle of the transducer head are skewed; and since the head will not completely cover the width of the recorded track at all times, signal level is reduced or lost entirely, causing the above-mentioned visual symptoms which range from the appearance of snow to a complete loss of picture.

Figure 1:
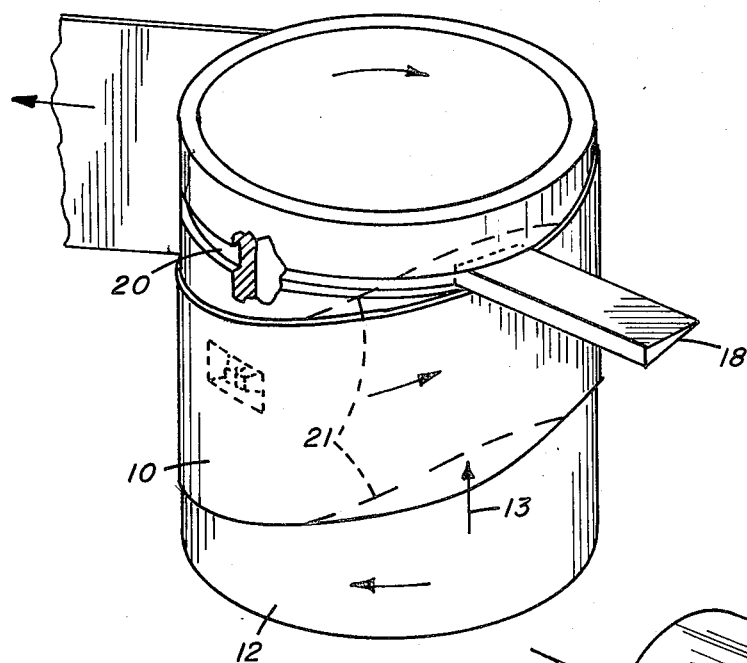
FIG. 1 is a perspective view of a fully rotatable drum modified by the present invention to control tape wander.

A presently preferred embodiment of the present invention, shown in FIG. 1, suppresses tape wander by the use of a wedge-shaped edge guide member 18 protruding into a groove 20 machined or molded in a drum 12 surface. The surface of the guide member 18 in contact with a tape 10 is inclined in accordance with the helix angle at which the tape 10 is wrapped around the drum 12. In this way, edge guidance is provided for the tape 10 while still permitting the drum 12 to rotate freely.

A definite advantage is obtained by locating the guide member 18 as shown in FIG. 1. When the tape 10 and the drum 12 move in the directions indicated by the arrows, the tape 10 is urged against the edge guide member 18. In other words, rotation of the drum 12 as indicated causes the tape 10 to ride in the direction of the arrow 13 over the face of the drum 12. By employing the groove 20 and the guide member 18 assembly, the tape 10 is prevented from bowing (as indicated by a pair of dotted lines 21), thereby causing the information to be recorded at a proper tracking angle.

It will be apparent to those skilled in the art that in accordance with the present invention, the guide member 18 may assume various forms. For example, the guide member may be a flat planar strip or a round pin. However, by providing a guide member with an extended surface for contacting the tape edge, an important additional advantage results in that "nicks" and other localized tape edge unevenness tend to be averaged out over the extended guide surface.

Figure 2:
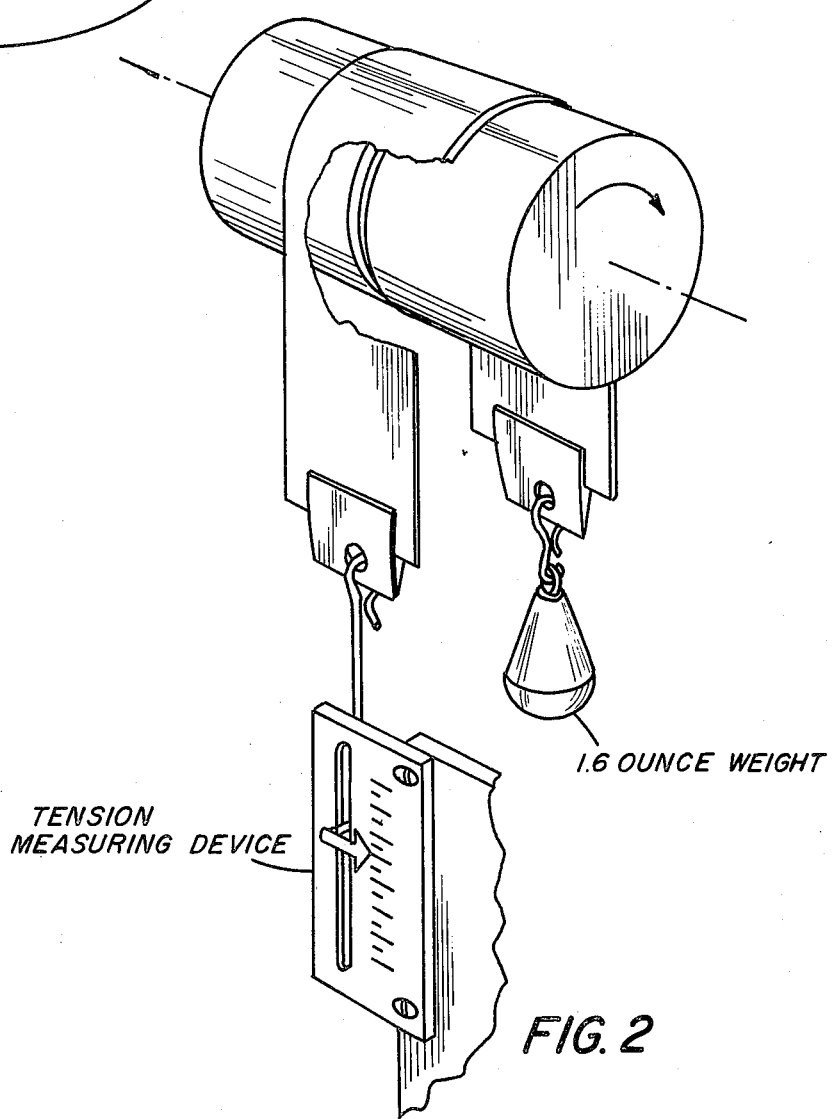
FIG. 2 shows an experimental setup used to obtain measurements of tape tension for various drum rotation rates.

It would appear that the groove 20 in the drum 12 surface would sap off the air trapped between the tape 10 and the drum 12. Were this to be so, the tape 10 and the drum 12 would come into direct contact, thereby producing the very frictional forces intentionally avoided by the use of a one-piece rotatable drum. In view of this concern, an experiment was conducted to determine the effect of the groove 20 on tape tension differential. As shown in FIG. 2, a 1.6-ounce weight is suspended from one end of a tape and a tension measuring device is attached to the other end of the tape. Tape tension measurements may be obtained for any desired drum rotation rate. The actual tape tension differential is the tape tension measurement minus 1.6 ounces.

Figure 3:
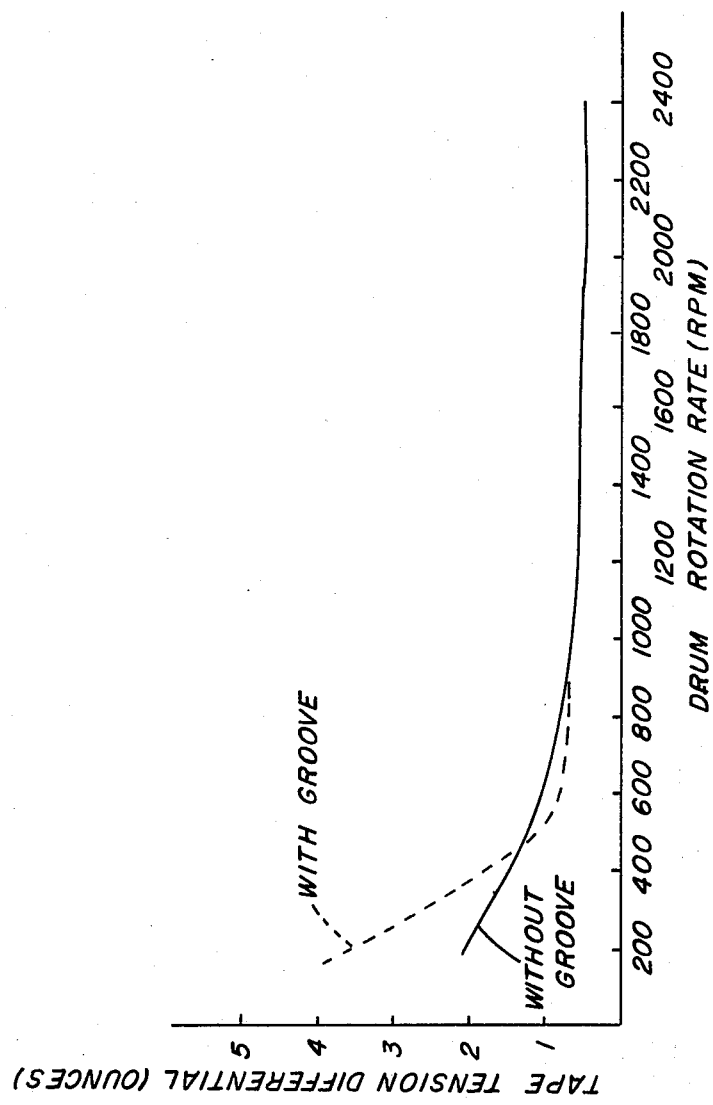
FIG. 3 is a graph of tape tension differential versus drum rotation rate for a drum with a groove and a drum without a groove.

Tape tension measurements were obtained for a drum with a groove and a drum without a groove at drum rotation rates from 200 to 2400 rpm. The results are given in graphical form in FIG. 3. As suspected, the tape tension differential is markedly higher when the groove is present, but only for drum rotation rates generally below 400 rpm. Apparently, for drum rotation rates above 400 rpm, air is trapped between the tape and the drum at a faster rate than it is bled off by the groove. Since drum rotation rates are generally above 800 rpm, the air layer is easily maintained and no additional tape tension differential is produced by the groove.

In practicing the invention, a drum having a groove as wide as 0.03 inches and rotating as slow as 800 rpm has been operated successfully with 8mm width tape, the groove not being large enough to allow the air layer to be bled out from under the tape. The drum diameter does not appear to be a critical factor, with drum diameters in the general range of 1 to 8 inches being contemplated as suitable for successful application of the invention.

Figure 4:
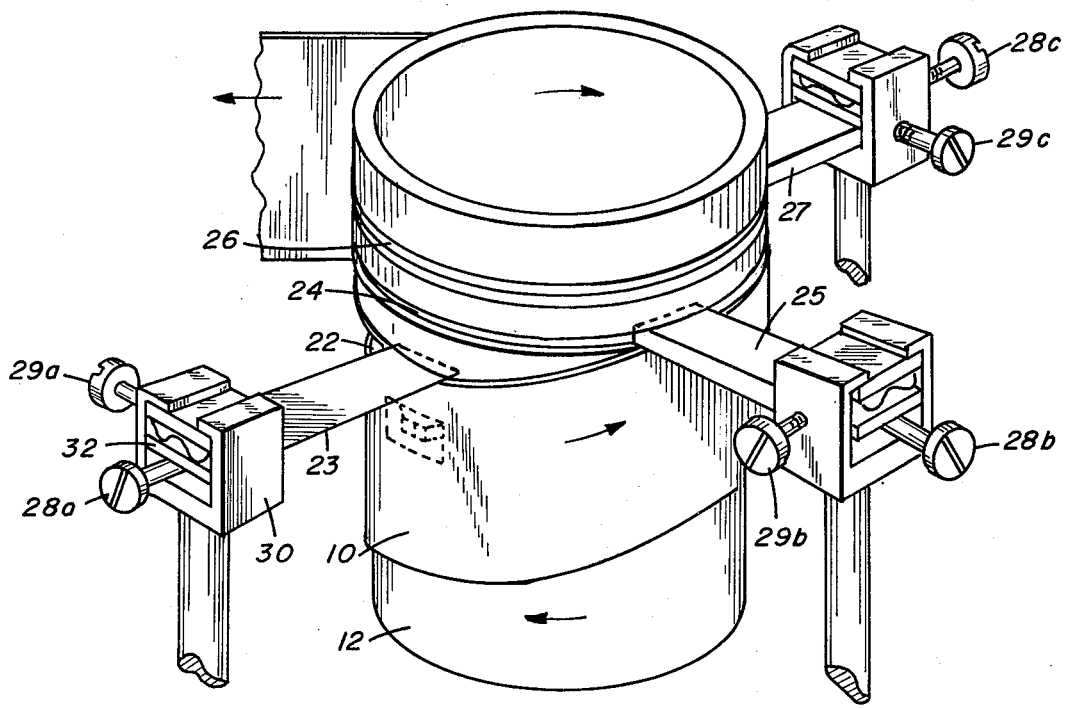
FIG. 4 shows the embodiment of FIG. 1 further modified by the invention to provide increased control of tape wander.

In accordance with the present invention, FIG. 4 shows a drum 12 modified to include three grooves 22, 24, and 26 in which three guide members 23, 25, and 27 protrude. The use of three guide members, instead of one, results in increased lateral stability and substantially eliminates the need for edge guides on the rollers, pins, etc, which feed the tape to the drum or exit the tape therefrom.

Figure 5:
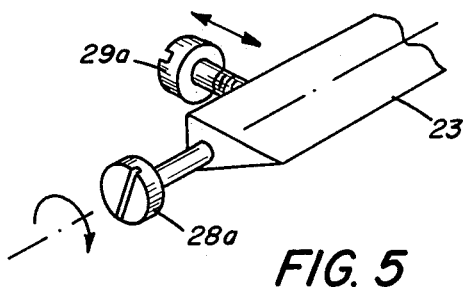
FIG. 5 is an enlarged view of a portion of a guide member showing two adjusting members.

As shown in FIGS. 4 and 5, a further advantage of the invention is obtained by providing each guide member with a pair of adjusting members 28a,b,c and 29a,b,c. The operation of the adjusting members is described with reference to the adjusting members 28a and 29a. (The operation of the adjusting members 28b,c and 29b,c are identical to the adjusting members 28a and 29a, respectively.) The adjusting member 28a is a screw which is fixedly mounted to the guide member 23. Turning the adjusting member 28a rotates the guide member 23 within the groove and about an axis extending radially from the drum 12, and thus enables the guide member 23 to be adjusted to the helix angle of the tape. The adjusting member 29a is a screw which adjusts the position of the guide member 23 in a direction generally parallel to the groove. A housing 30 has a spring-loaded clamp 32 which holds the adjusting member 28a, and thus the guide member 23, in the desired position and orientation.

Figure 6:
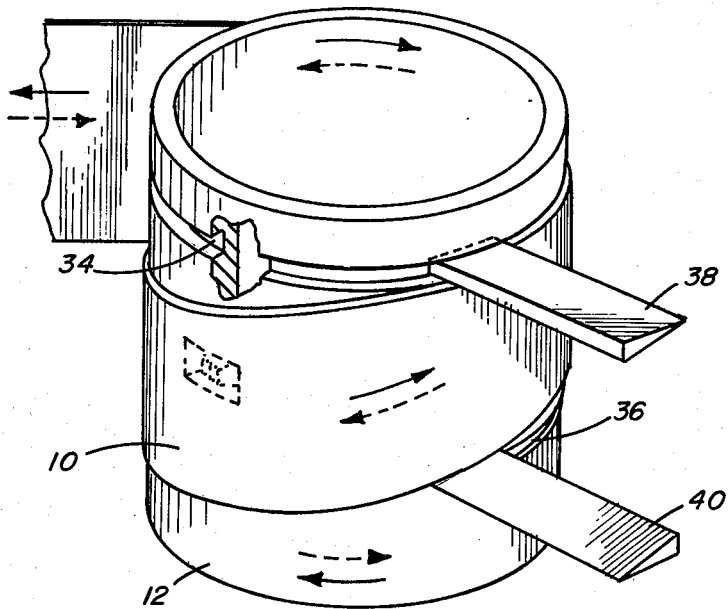
FIG. 6 shows a fully rotatable drum modified by the invention to provide edge guidance for both edges of the tape.

Another aspect of the present invention is shown in FIG. 6. A pair of grooves 34 and 36 and a pair of guide members 38 and 40 are provided and so located that a guide member may be positioned on both sides of the tape 10. This aspect of the invention is especially important if it is desired to reverse the direction of tape advancement and drum rotation (indicated by dotted arrows). This embodiment of the present invention controls "bowing" and wander regardless of the direction of tape advancement and drum rotation.

The invention has been described in detail with particular reference to preferred embodiments thereof, but it will be understood that variations and modifications can be effected within the spirit and scope of the invention. For example, in the case of a drum having a plurality of grooves and guide members cooperating in accordance with the invention, the grooves may be of different sizes, and the guide members may be of different types (or sizes); a particular type of guide member being designed to cooperate with a particular size groove.

What is claimed is:

1. Apparatus for guiding a recording tape in a recording machine, said apparatus comprising:
    an edge guide member;
    a generally cylindrical drum and means mounting said drum for rotation about its longitudinal axis, said drum having a groove in said drum surface, said groove extending circumferentially around said drum surface, and said groove being large enough to permit said guide member to protrude therein;
    means supporting said guide member in a fixed position such that said guide member protrudes into said groove and abuts an edge of the tape, whereby during operation the tape advances over said rotating drum and is restrained from lateral wander by said guide member.

2. Apparatus as claimed in claim 1 wherein said drum is provided with a plurality of circumferential grooves, and a plurality of guide members, said supporting means supporting each of said guide members in a fixed position such that each of said guide members respectively protrudes into one of said grooves and abuts an edge of the tape.

3. Apparatus as claimed in claim 1 wherein said apparatus includes means for providing relative adjustment of the position of said guide member in a direction generally parallel to said groove.

4. Apparatus as claimed in claim 1 including means for rotating said guide member about an axis extending radially from said drum.

5. Apparatus for guiding a recording tape in a video recording machine, said apparatus comprising:
    a plurality of edge guide members;
    a generally cylindrical drum and means mounting said drum for rotation about its longitudinal axis, said drum having a plurality of grooves in said drum surface, said grooves extending circumferentially around said drum surface, and each of said grooves being sufficiently large to permit a respective guide member to protrude therein;
    means supporting said guide members in a fixed position such that each of said guide members extends into one of said grooves and abuts an edge of the tape, whereby during operation the tape advances over said rotating drum and is restrained from lateral wander by said guide members.

6. For use in a video recording machine of the type having a generally cylindrical drum and means mounting the drum for rotation about its longitudinal axis, which drum is provided with a groove in the drum surface and said groove extends circumferentially around the drum, apparatus comprising a guide member small enough to protrude into said groove, and means supporting said guide member in a fixed position such that said guide member protrudes into said groove for abutting an edge of a recording tape, whereby during operation the tape advances over the rotating drum and is restrained from lateral wander by said guide member.

7. In a drum-type video recording machine having a drum and means mounting the drum for rotation about its longitudinal axis and around which drum a recording tape is at least partially wrapped, the improvement wherein:
    the drum has a groove extending circumferentially around the outer drum surface, and said machine includes an edge guide member small enough to extend into said groove, and means supporting said edge guide member in a fixed position such that said guide member extends into said groove and abuts an edge of the tape;
    whereby during operation, the drum may rotate freely and lateral tape wander is controlled by guiding the edge of the recording tape with said edge guide member.

8. An apparatus as claimed in claim 7 wherein said machine includes means for adjusting the position of said guide member in a direction generally parallel to said groove.

9. An apparatus as claimed in claim 7 wherein said machine includes means for rotating said guide member about an axis extending radially from said drum.

10. In a drum-type video recording machine having a drum and means mounting the drum for rotation about its longitudinal axis and around which drum a recording tape is at least partially wrapped, the improvement wherein:
    the drum has a pair of grooves extending circumferentially around the outer drum surface and said machine includes a pair of edge guide members small enough to extend into said grooves respectively, and means supporting said edge guide members in a fixed position, one of said edge guide members extending into one of said grooves, and the other of said edge guide members extending into the other of said grooves, said grooves being located so that said two edge guide members are on and abut opposite sides of the tape;

whereby during operation, the drum may rotate freely and tape wander is controlled by guiding both edges of the recording tape with said edge guide members.

11. Apparatus for guiding a recording tape in a recording machine, said apparatus comprising:

a generally cylindrical drum and means mounting said drum for rotation about its longitudinal axis, said drum having a groove in the drum surface generally less than .04 inches, said groove extending circumferentially around said drum surface;

an edge guide member of suitable size to extend into said groove;

means for rotating said drum at a rate in excess of 800 rotations per minute;

means supporting said guide member in a fixed position so that said guide member protrudes into said groove and abuts an edge of the tape, whereby during operation the drum rotates at a rate in excess of 800 rotations per minute and the tape advances over said rotating drum, the tape being supported by an air layer formed by air trapped between the tape and said drum, and the tape is restrained from lateral wander by said edge guide member.

* * * * *